Figure 1:
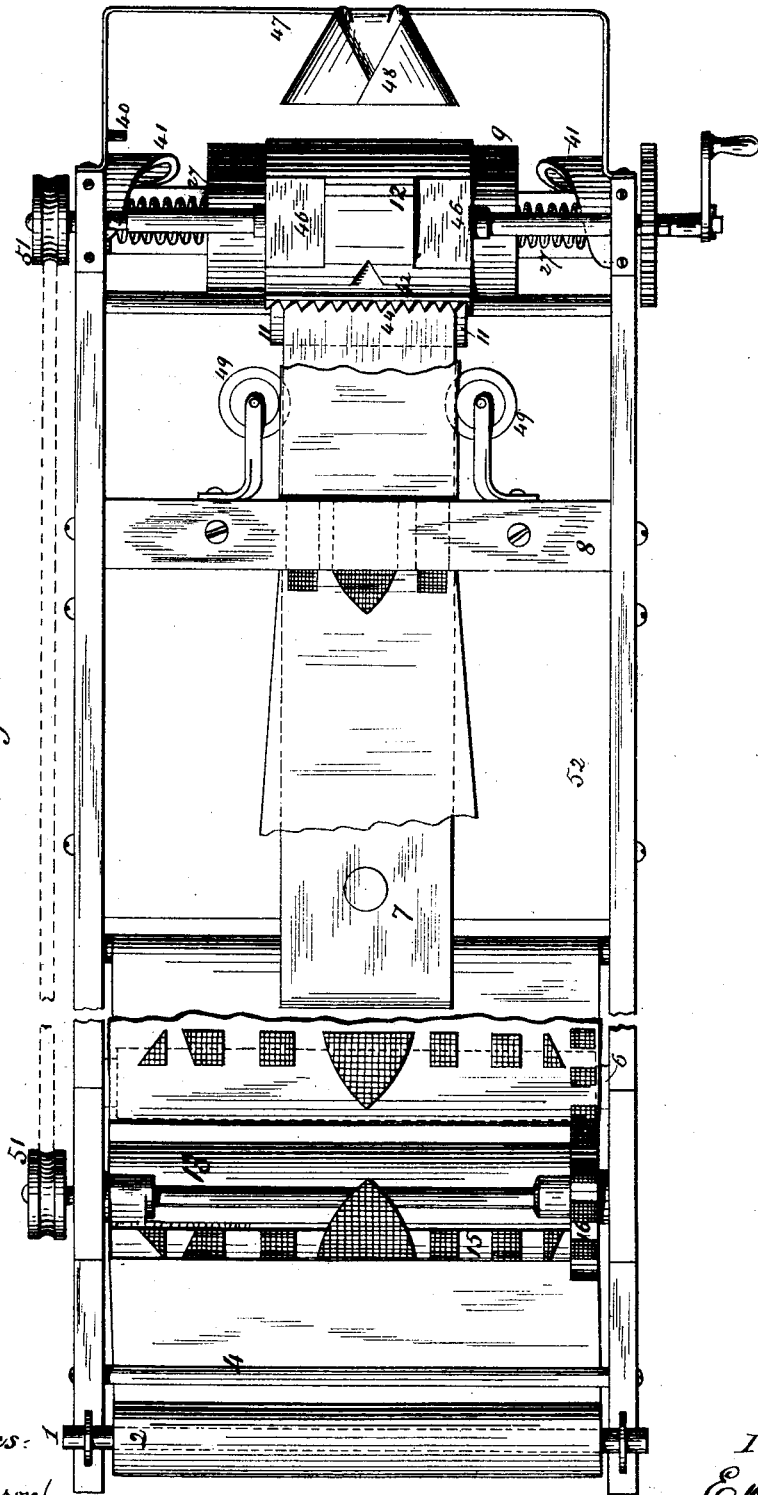

E. B. STOCKING.
Paper-Bag Machine.

No. 223,961.   Patented Jan. 27, 1880.

Witnesses:
E. E. Masson
W. B. Masson

Inventor:
E. B. Stocking

4 Sheets—Sheet 2.
E. B. STOCKING.
Paper-Bag Machine.
No. 223,961. Patented Jan. 27, 1880.
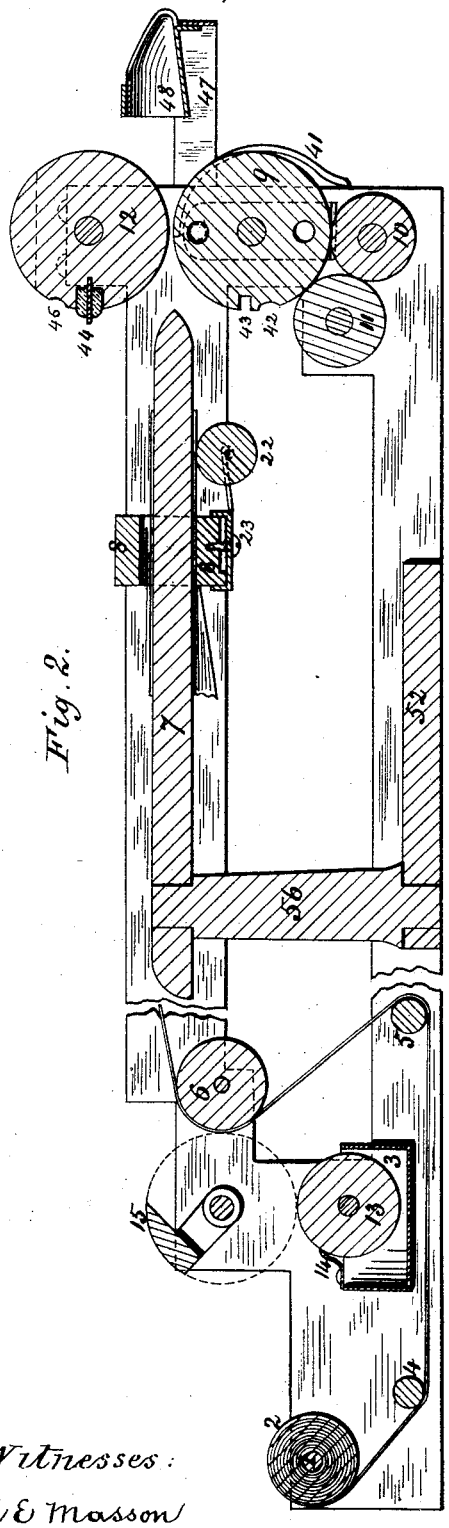
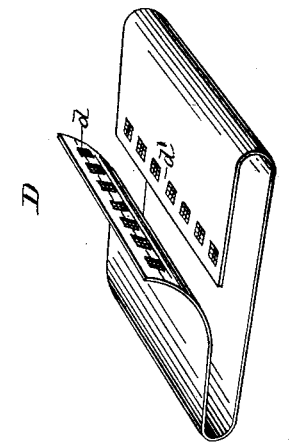
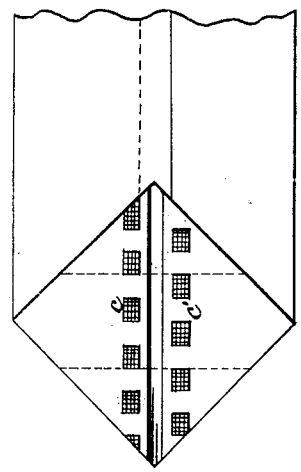
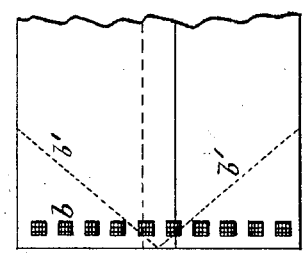
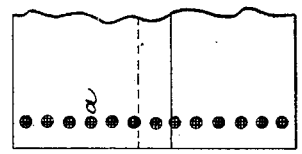
Witnesses:
E. E. Masson
W. B. Masson
Inventor
E B Stocking 4 Sheets—Sheet 3.
E. B. STOCKING.
Paper-Bag Machine.
No. 223,961. Patented Jan. 27, 1880.
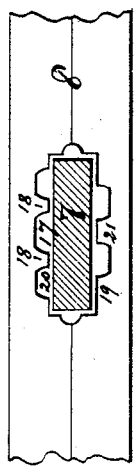
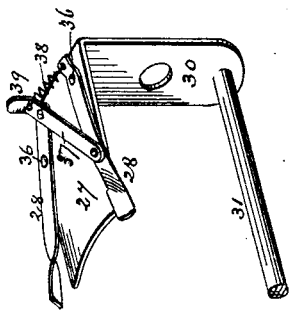
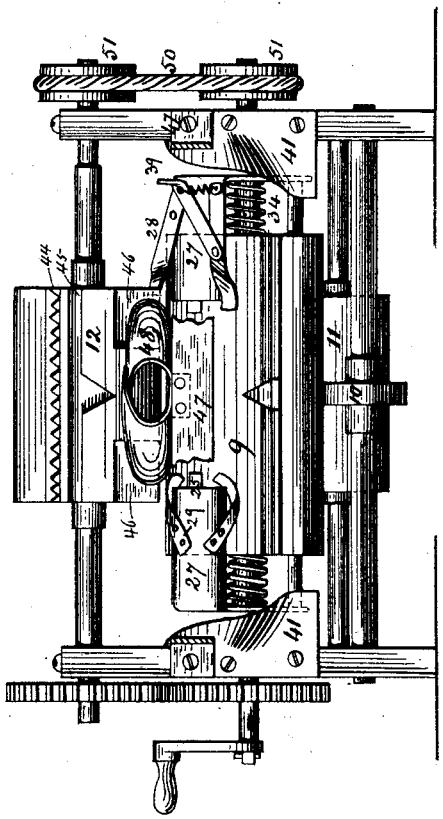
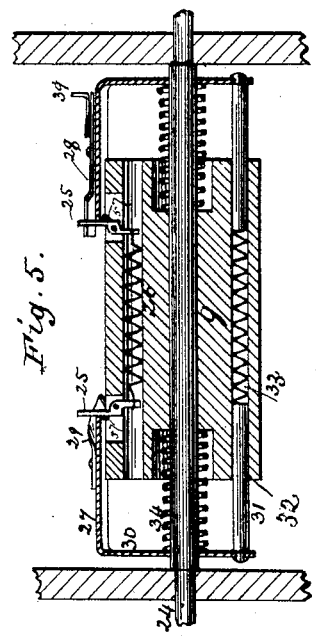
Witnesses:
E. E. Masson
W. B. Masson
Inventor:
E. B. Stocking 4 Sheets—Sheet 4.

E. B. STOCKING.
Paper-Bag Machine.

No. 223,961.     Patented Jan. 27, 1880.

Witnesses:
E. E. Masson
W. B. Masson

Inventor:
E. B. Stocking

UNITED STATES PATENT OFFICE.

EDGAR B. STOCKING, OF SYRACUSE, NEW YORK.

PAPER-BAG MACHINE.

SPECIFICATION forming part of Letters Patent No. 223,961, dated January 27, 1880.

Application filed November 28, 1879.

*To all whom it may concern:*

Be it known that I, EDGAR B. STOCKING, a legal resident of Syracuse, in the county of Onondaga and State of New York, and temporarily residing at Washington, District of Columbia, have invented certain new and useful Improvements in Paper-Bag Machines, of which the following is a description, reference being had to the accompanying drawings, making a part hereof.

My invention relates to that class of machines which are employed in the manufacture of satchel-bottomed paper bags, and in which the paper is supplied from a continuous sheet or web, is pasted at the seam-forming portion, is wrapped about a former into a tubular condition, from which tube bag-lengths are cut, opened to the diamond form, and presented to an endless bed or carrier, which constantly revolves when in operation, where, by suitable supplementary devices, paste is applied to the desired portions of said diamond fold and the forward and rear points thereof folded upon its central portion, and is delivered from said bed or carrier a completed bag.

My improvements have relation to a method of applying paste to the desired portions of material which are to be afterward brought in contact with each other to form seams or connected parts, and to the means I employ to adapt machinery for making satchel-bottomed paper bags to practice the method.

As regards the first part of my invention, it consists in the method of applying paste to those portions of material which are to be united thereby, herein set forth and claimed— viz., locating the paste upon the material in dots, broken lines, or disconnected portions, placed in such proximity to each other that when the parts of the material are brought together, the usual pressure applied causes each dot or disconnected portion of paste to spread toward the others in said broken line of paste, whereby they meet and constitute a continuous line of paste between the plies of material united thereby.

Paste has heretofore been applied in isolated patches, so that in the subsequent manipulation of the material they serve to connect the plies thereof; but when so connected intermediate spaces occurred between the plies which were entirely unpasted; whereas in my method the plies are connected by a perfectly continuous line, though the paste is applied in a non-continuous and broken line.

Among the advantages derived from my method are a lessening of the effect produced by the usual or continous-line method, which is to so thoroughly dampen the material along such line that it is liable to there shrink, kink, and fold more readily than at surrounding portions, thus producing irregularity and roughness in the finished product; and another and more important advantage is that my method enables me to entirely discard the supplementary pasting devices above mentioned—that is, the secondary devices which apply paste to the bottom-forming portion of the blank, the primary pasting devices having supplied the seam portion thereof.

The particular conformation and relative position of the bottom-forming portion of the tubular blank, when in diamond form, to its body portion renders necessary additional, and in many instances complicated, devices for the proper application of paste thereto; and the prime object and advantage of my method is that these and their accompanying expense are avoided.

By the application of paste in broken lines, as heretofore explained, portions of the material are unpasted, and are therefore in condition to be readily manipulated into the desired shape without danger of smearing the paste upon undesired portions of said material, or upon the machinery employed in such manipulation, provided the said machinery is adapted to operate upon such material so pasted.

The second part of my invention relates to the means by which machinery is adapted to meet the requirements above stated.

If the paste is required upon one or the other or upon both sides of the material, I apply it according to the requirements of the article to be produced, and in broken lines, and the machinery which operates upon such pasted material is provided with contact or forming portions, so situated that in the progress of the material through the machine such contact or forming portions touch and operate upon the material at the unpasted portions of the broken lines, and the non-bearing and non-forming portions form passages or ways for the pasted portions of the broken lines.

The second part of my invention consists in a former provided with channels or grooves, whereby the material bearing broken lines of paste is manipulated into a desired shape without smearing or spreading the paste upon undesired portions of either the material or machinery, and whereby the required paste in required positions may be applied at one operation for all subsequent manipulation to produce the desired article.

My invention further consists in certain mechanism for forming the diamond fold, and for closing it to make a completed satchel-bottomed bag while the blank is continuously moving upon and with an endless bed or carrier; and it also consists in other details of mechanism hereinafter described and claimed.

To enable those skilled in the art to which my invention relates to make and use or practice the same, I proceed to more particularly describe the embodiment and application thereof as illustrated in the drawings heretofore referred to, in which like characters refer to like parts in all the figures, and in which—

Figure 1 is a plan view of a satchel-bottomed paper-bag machine of that class hereinbefore described, and embodying my improvements. Fig. 2 is a central longitudinal vertical section. Fig. 3 is a front-end elevation, and Figs. 4, 5, and 6 are details of the mechanical construction of the same. Figs. 7, 8, 9, and 10 are details of the mechanical operation; and diagrams A B C D represent and illustrate my method of applying paste.

In applying paste according to my method I may locate it in straight or curved lines, as necessity may require, such lines consisting of dots or spaces, or, as I have hereinbefore termed them, "broken lines," each being the equivalent of the other, the object and result being a blank, or material having portions of its seam and joint forming parts pasted and other portions unpasted, these latter permitting contact in subsequent manipulations, as heretofore described. At diagrams A and B, I have illustrated such a disposition of the paste as at $a$ and $b$.

It will be found advantageous at times that a due regularity should be observed in the location of the dots or spaces. Thus in diagrams C and D, as at $c\ c'\ d\ d'$, I have illustrated the regular alternation of the paste dots or spaces upon the opposite plies of the material, so that when folded to their final position—that which they occupy in the completed article—the unpasted and pasted points in the broken line of one ply fall between the like points of the line upon the opposite ply, and this alternation of the paste-spaces may be applied to one or the other or to both sides of the material at one or more operations; and I have illustrated in the present case means involving such alternation, although it is apparent that the non-alternated spaced broken lines are equally, and with slight variations of the means employed fully, adapted to use.

Within and upon a suitable frame-work is supported the working parts of the machine. The break in Figs. 1 and 2 indicates that the parts thus separated should be suitably distant from each other.

Upon the roll 1 is the web of material, 2, which is conducted beneath the paste-trough 3 by stretching-rolls 4 and 5, and from thence to the guide-roll 6, around the inside former, 7, between it and the outside former, 8, to the rotating bed or carrier 9, between it and the center pressure-roll, 10, and complete pressure-roll 11. During this passage through the machine the material is subjected to the various operations requisite to the making of a completed satchel-bottomed bag, the web being of proper width and situated a proper distance from the formers, and these and the carrier and the pressure-rolls and other acting parts being of proper relative proportions to make bags of a desired size.

Within the paste-trough 3 rotates a paste-roll, 13, its supply, regulated by a doctor, 14, being conveyed to the material by the pasting-bar 15 and disk 16, provided with raised portions adapted to convey paste in dots or broken lines by contact with said material as it passes over roll 6.

The disk 16 and the circle described by the transverse bar 15 are equal in circumference to the bed or carrier 9 and the pressure, feed, and cutting roll 12; and these pasting devices may be geared, by belt 50 and pulleys 51, to said roll 12, or to the bed or carrier 9, and these with rolls 10 and 11, so that the surface movement of all shall be equal and uniform.

The inside former, 7, is supported at its rear end by the standard 56 upon the base-plate 52, and passes through the outside former, 8, as clearly shown in Fig. 4.

It will be observed that the transverse pasting-bar 15 has a raised surface at its center, and that paste will be applied thereby to the center of the web and upon its upper side; hence the outside former is channeled or grooved at 17 to permit the passage of such pasted portion, without contact therewith, while at 18 18 the former is whole or unchanneled, so that these parts come into full contact with the unpasted portions of the material.

At 19 the reverse of 17 occurs, because the bar 15 does not apply paste to that portion of the web which passes through the former at this point, that being an alternating space, as illustrated in diagram C, and which, when the material is subsequently opened to the diamond form, will appear as shown at $c\ c'$. If the paste is required upon the opposite, or what becomes the inner, side of the material, the same system of channels should be formed upon the inside former, 7, and in either case the alternation of channels should agree with that of the transverse bar 15, and in the application of the disposition shown in diagrams A and B the channels would be equal to or a trifle greater in width than the raised surfaces of the paste-bar. The disk 16 is also arranged in like manner to the bar, or it may apply a continuous line, as the machinery is protected by the opposite seam-forming edge of the material from becoming smeared with paste; hence no channel is provided at 21.

I deem it proper to add that the particular location of the raised surfaces and channels of the bar 15 and former 8, respectively, might be changed without departing from the spirit of my invention, and to this end these parts might be made adjustable. For example, the bar may be made T-grooved, and the pasting surfaces or projections may be type having downward T-projections fitting into said groove, and the ribs dividing the channels of the former might be constructed in like manner, and both held in place by set-screws in any suitable manner.

Attached to the former 8 is a spring-seated seam-pressure roll, 22, adjusted by screw 23.

The endless bed or carrier consists of a cylinder the circumference of which is equal to the length of a single bag-blank, and is secured to a shaft, 24, (see Fig. 5,) and is provided with side nippers, 25, pivoted therein and held open by a coiled spring, 26, when not otherwise influenced.

27 27 are what I have herein termed "diamond-fold formers," and they consist of plates conforming in shape to, or nearly to, the periphery of the bed or carrier 9, and are adapted to be reciprocated laterally upon it while in motion by being movably attached to and supported by said carrier by their extensions 30 riding the shaft 24, and provided with guide-rods 31, running in ways 32 in the carrier. These diamond-fold formers are caused, when not otherwise influenced, to separate and remain separated by spring 33 within the ways 32 and springs 34 about the shaft 24. Each of the diamond-fold formers is provided with second and third fold formers, (see Figs. 3, 6, 9, and 10,) which may be either curved fixed guides, as in Fig. 9, or swinging folders pivotally attached to said formers, as in Fig. 6, 28 28 being such swinging folders, pivoted at 36 and connected by a link, 37, and, when not otherwise influenced, held open at their free ends by a spring, 38, and closed (to operate as they are being closed) by the projection 39 when acted upon by a stationary cam, 40, Fig. 1, of suitable shape and extent to hold them closed for a desired time, in a manner hereinafter described with reference to the diamond-fold formers. The fixed second and third fold formers 29 29 are extended and curved beneath the diamond-fold formers for a purpose hereinafter made apparent.

Within the frame-work are provided cams 41 41, Figs. 1 and 3, of suitable contour to cause the formers 27, by contact therewith, to approach each other while the bed or carrier is in motion, to remain in close proximity for a time, and then to separate. During this movement of the diamond-fold formers they close and hold closed the nippers, and upon separating they allow said nippers to open. The projections or ribs 57 upon the nippers serve to raise the second-fold formers over the side edges of the body of the blank.

The nippers may be operated by independent means, if desired.

The bed or carrier is also provided with transverse grooves 42 43, the former being to prevent contact with the pasted portion of the blank and the latter to receive the transverse severing-blade 44, carried by the feed-pressure roll 12, which has also groove 45, the companion of groove 42 of carrier 9. (See Fig. 2.) Roll 12 is also cut away at 46 46 for the reception and operation of the nippers 25.

Beneath the bed or carrier 9 is a center pressure-roll, 10, of such width of face as to pass between the diamond-fold formers when in their projected or nearest position to each other, and beyond roll 10 is the complete pressure-roll 11, of such width of face as to press the entire bag-bottom, and also to pass between the diamond-fold formers when in their retracted or farthest position from each other.

The relative position of rolls 10 and 11 may be changed to bring the point of delivery nearer the front of the machine, if desired.

Directly in front of the feed-line of roll 12 and carrier 9, and supported upon a bracket, 47, is an auxiliary device, which I may use for the purpose of preliminarily and partially opening the tubular blank at the commencement of the action of the diamond-fold formers. It consists of a flattened funnel-shaped cup or pocket, 48, of a suitable size at its mouth to receive the end of the tubular blank, and of a gradually-decreasing width toward its terminus.

I have also shown creasing-rolls 49 running in grooves in the sides of the former, producing creases, and I may also crease the tube, as at $b'$, diagram B, all of which cause the blank to more readily take the diamond form; but I do not deem these nor the cup or pocket 48 essential to the complete operation of the machine, but use them to insure the greatest regularity in the form of the finished product.

Figure 8:
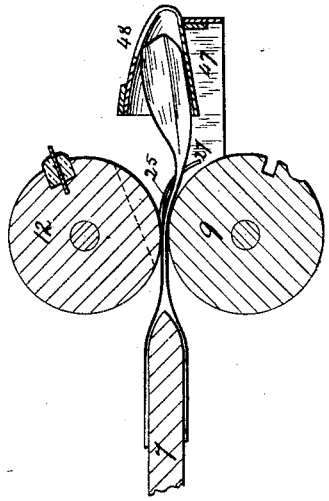
Figure 10:
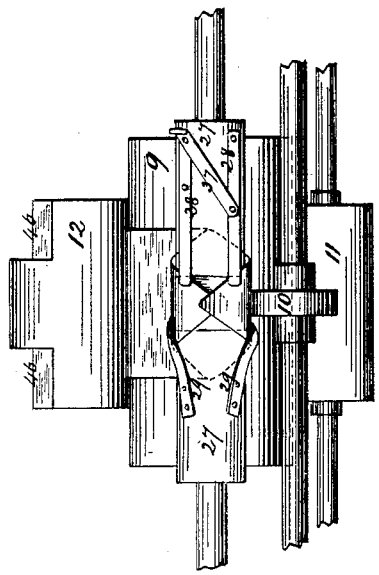
Figure 7:
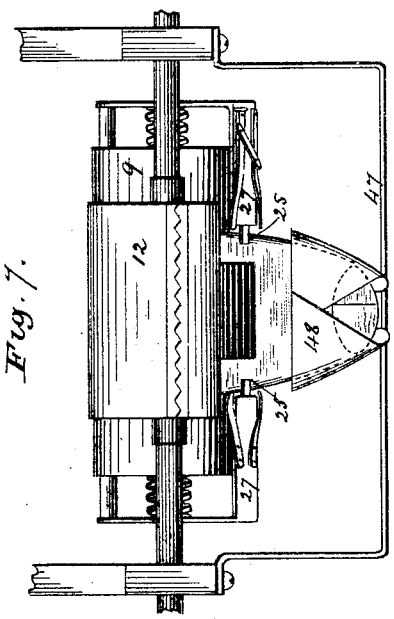
Figure 9:
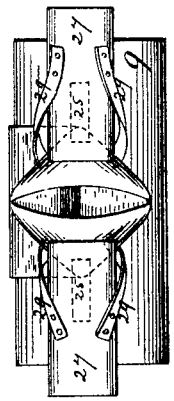

The web, being supplied and under the influence of any suitable tension device well known, is conducted as hereinbefore stated, when the operation is as follows: From roll 13 paste is taken by the transverse bar 15 and disk 16 and applied to the material (in this instance upon its upper side) upon roll 6. When it reaches the outside former, 8, the pasted portions of the transverse line pass through the channels, and, the seam portion being pressed by roll 22, a tubular blank is formed. The side-creasers, if employed, now form inwardly-projecting creases at the edges of the tube, and it is then drawn forward by the roll 12 and bed or carrier 9. The first function that these then perform is to sever the tube transversely by means of the knife 44, flanked by rubber cushions, which bite upon the material and strain it across the groove 43, while the knife is forced through, when the transverse paste-lines, which now lie upon the upper and lower plies of the tube near its end, are below and above the grooves 45 and 42, respectively, and this free forward end of the tube advances in the line of feed, and, if the cup or pocket 48 be used, is received and laterally compressed and partly opened by it, as shown in Figs. 7 and 8. The diamond-fold formers come under the influence of cams 41, throw over and close the nippers 25 just as they are at the contact-line of roll 12 and carrier 9, and the folders, still advancing laterally, press down the central portion of the diamond fold, as clearly shown in Fig. 9, while the second and third fold formers are beneath said points, and gradually guide, bend over, and lay down said folds, as shown in Fig. 10. These remain in this position until the bag-bottom arrives at and passes under the influence of center pressure-roll, 10, and when this has gained control of the back point of the diamond the folders are released from cams 41 and quickly fly outward laterally, leaving the bag-bottom in the bite of roll 11, which presses its entire surface and delivers it completed onto base-plate 52. The feed, having continued, has severed said bag from the following tubular blank, and is presenting the free end thereof to the cup or pocket and to the action of the nippers and folders, which have arrived at their operative position, and the same movements are repeated.

By my method of applying paste, and by providing the endless bed or carrier with diamond-fold-forming devices, I have very much simplified the entire machine.

It is apparent that these bottom-forming devices may be used with other tube-forming mechanism, and that the tube-forming mechanism here shown may be used with other bottom-forming mechanism without departing from an embodiment of my invention. In the former case suitable well-known supplementary pasting devices may be located between rolls 12 and 10 in front of the carrier; and it is also apparent that severed tubular bag-blanks might be fed to these bottom-forming devices.

These different adaptations I deem as included in my invention whenever they involve the use of devices and combinations of devices herein claimed; but I prefer the arrangement and embodiment herein shown and described; and I deem it proper to add that the method herein disclosed is not limited in its application to paper bags of the class hereinbefore mentioned, but is also equally adapted to the manufacture of various articles constructed of paper and similar materials which are secured by paste or cement.

Having described and illustrated my method and means employed in the art of making satchel-bottomed paper bags, what I claim as new, and desire to secure by Letters Patent, is—

1. The method of applying paste to those portions of material which are to be united thereby, which consists in locating the paste in broken lines, as and for the purpose set forth.

2. The method of applying paste to those portions of material which are to be united thereby, which consists in locating the paste in broken lines arranged to alternate when said portions are brought together, as and for the purpose set forth.

3. In the manufacture of paper bags, the method of applying paste to those portions of the material which are to be united thereby, which consists in locating a longitudinal line of paste at the edge of the material and broken transverse lines thereon at bag-lengths from each other, as and for the purpose set forth.

4. A former provided with channels, whereby pasted portions of the material pass unobstructed and unpasted portions are, by said former, manipulated and pressed to the desired shape, as and for the purpose set forth.

5. The combination, with a former having channels, of pasting mechanism adapted to apply paste in broken lines, all substantially as shown and described.

6. The combination of pasting mechanism adapted to apply paste in broken lines, formers having channels, and feeding mechanism, all substantially as shown and described, whereby material with paste applied is shaped and fed to subsequent mechanism.

7. The combination of pasting mechanism adapted to apply paste in broken lines, formers having channels, feeding mechanism having grooves, and subsequent folding mechanism, all substantially as shown and described, whereby paste is applied at one operation to the material, and the material is subsequently folded into a complete article.

8. A rotating endless bed or carrier provided with laterally-reciprocating diamond-fold formers, substantially as shown and described.

9. A rotating endless bed or carrier provided with laterally-reciprocating diamond-fold formers and second and third fold formers, substantially as shown and described.

10. A rotating endless bed or carrier provided with laterally-reciprocating diamond-fold formers having rigidly attached second and third fold formers, substantially as shown and described.

11. A rotating endless bed or carrier provided with diamond, second, and third fold formers and tube-severing mechanism, combined therewith and operating thereupon, substantially as shown and described.

12. A rotating endless bed or carrier provided with diamond, second, and third fold formers and a center pressure-roller, combined therewith and operating thereupon, substantially as shown and described.

13. The combination of feed-rolls, as 9 and 12, and a contracting cup or pocket with folding mechanism, all substantially as and for the purpose set forth.

EDGAR B. STOCKING.

Witnesses:
E. A. DICK,
M. GEORGII.